(12) United States Patent
Okumoto et al.

(10) Patent No.: US 8,079,340 B2
(45) Date of Patent: Dec. 20, 2011

(54) SYSTEM FOR RESTARTING INTERNAL COMBUSTION ENGINE WHEN ENGINE RESTART REQUEST OCCURS

(75) Inventors: Kazushige Okumoto, Kariya (JP); Akira Kato, Kani (JP); Takashi Senda, Niwa-gun (JP); Mitsuhiro Murata, Niwa-gun (JP); Masami Niimi, Handa (JP); Kiyokazu Haruno, Anjo (JP)

(73) Assignee: Denso Corporation, Kariya (JP)

( * ) Notice: Subject to any disclaimer, the term of this patent is extended or adjusted under 35 U.S.C. 154(b) by 167 days.

(21) Appl. No.: 12/588,079

(22) Filed: Oct. 2, 2009

(65) Prior Publication Data

US 2010/0083926 A1 Apr. 8, 2010

(30) Foreign Application Priority Data

Oct. 4, 2008 (JP) ................................. 2008-259141
Aug. 5, 2009 (JP) ................................. 2009-182054

(51) Int. Cl.
*F02N 11/08* (2006.01)

(52) U.S. Cl. ............ 123/179.4; 123/179.28; 123/179.25

(58) Field of Classification Search ............... 123/179.3, 123/179.4, 179.25, 179.28
See application file for complete search history.

(56) References Cited

U.S. PATENT DOCUMENTS

| 6,459,167 | B1 | 10/2002 | Yamanashi |
| 6,935,202 | B2 * | 8/2005 | Siems et al. ........................ 74/9 |
| 2002/0140291 | A1 | 10/2002 | Osada et al. |
| 2008/0127927 | A1 | 6/2008 | Hirning et al. |
| 2008/0162007 | A1 | 7/2008 | Ishii et al. |
| 2010/0050970 | A1 * | 3/2010 | Okumoto et al. ........... 123/179.4 |
| 2010/0101522 | A1 * | 4/2010 | Ge et al. ...................... 123/179.3 |
| 2010/0251852 | A1 * | 10/2010 | Murata et al. .................... 74/7 A |
| 2010/0264670 | A1 * | 10/2010 | Usami et al. ................ 290/38 R |
| 2010/0264765 | A1 * | 10/2010 | Haruno et al. ................... 310/71 |
| 2010/0282200 | A1 * | 11/2010 | Notani et al. ............... 123/179.3 |
| 2010/0299053 | A1 * | 11/2010 | Okumoto et al. .............. 701/113 |
| 2010/0326389 | A1 * | 12/2010 | Okumoto et al. .......... 123/179.4 |
| 2011/0118962 | A1 * | 5/2011 | Couetoux et al. ............. 701/113 |

(Continued)

FOREIGN PATENT DOCUMENTS

CN 101210534 A 7/2008

(Continued)

OTHER PUBLICATIONS

Feb. 11, 2010 Office Action issued in corresponding European Patent Application No. 09012517.0.

(Continued)

*Primary Examiner* — Hai Huynh
(74) *Attorney, Agent, or Firm* — Oliff & Berridge, PLC

(57) ABSTRACT

In a system for cranking a crankshaft of an internal combustion engine, a starter is provided with a motor working to, when energized, rotatably drive an output shaft with a pinion and an actuator working to, when energized, shift the pinion toward the ring gear to be engaged with the ring gear. A power supply is electrically connected to the motor and operative to output electrical power. A first mechanical relay is electrically connected between the power supply and the motor, and works to turn on and off a supply of a current based on the electrical power to the motor for rotating the pinion. A switching element is electrically connected across the first mechanical relay, and works to turn on and off the supply of the current to the motor for rotating the pinion.

10 Claims, 11 Drawing Sheets

U.S. PATENT DOCUMENTS

2011/0187127 A1* 8/2011 Murata et al. ............... 290/38 C
2011/0203410 A1* 8/2011 Notani ........................... 74/7 R

FOREIGN PATENT DOCUMENTS

| DE | 102 49 381 A1 | 5/2003 |
| DE | 10 2005 004 326 A1 | 2/2006 |
| DE | 10 2006 034 837 A1 | 2/2007 |
| EP | 1 041 275 A1 | 10/2000 |
| EP | 1 939 444 A2 | 7/2008 |
| FR | 2 864 584 A1 | 7/2005 |
| JP | A-58-176465 | 10/1983 |
| JP | A-2008-510099 | 4/2008 |
| JP | A-2008-121648 | 5/2008 |
| WO | WO 2008/131983 A1 | 11/2008 |

OTHER PUBLICATIONS

European Search Report dated Jul. 8, 2010 for corresponding European Patent Application No. 09 012 517.0.
Notice of Reasons for Rejection dated Aug. 10, 2010 in corresponding Japanese Application No. 2009-182054 (with translation).
Office Action issued in Chinese Patent Application No. 200910179071.1 dated Apr. 1, 2011 (with Translation).

* cited by examiner

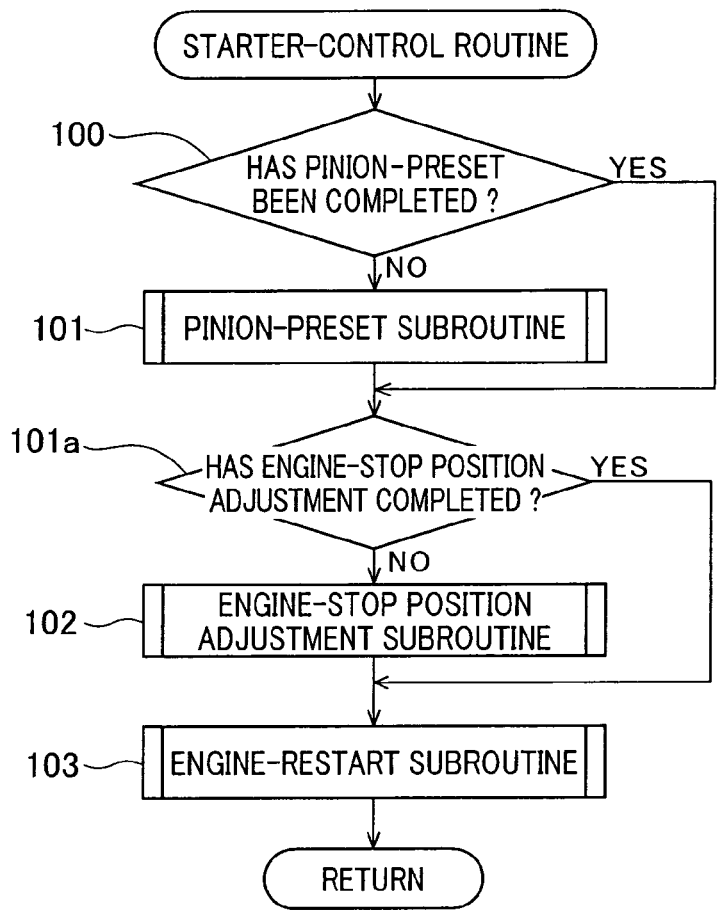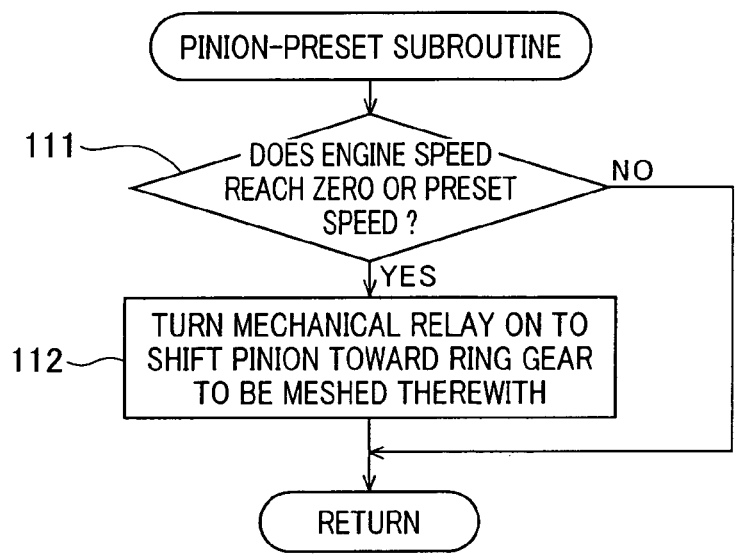

SYSTEM FOR RESTARTING INTERNAL COMBUSTION ENGINE WHEN ENGINE RESTART REQUEST OCCURS

CROSS REFERENCE TO RELATED APPLICATIONS

This application is based on Japanese Patent Applications 2008-259141 and 2009-182054 filed on Oct. 4, 2008 and Aug. 5, 2009, respectively. This application claims the benefit of priority from the Japanese Patent Applications, so that the descriptions of which are all incorporated herein by reference.

FIELD OF THE INVENTION

The present invention relates to systems for restarting internal combustion engines when an engine restart request occurs.

BACKGROUND OF THE INVENTION

Some types of vehicles installed with an engine automatic stop-and-start system, such as an idle reduction control system, have been recently developed for reduction in fuel cost, in exhaust emission, and the like. Such engine automatic stop-and-start systems are designed to control an internal combustion engine, referred to simply as engine, installed in a vehicle so that the engine speed is reduced toward zero in response to a driver's engine stop request. After the stop of the engine, these engine automatic stop-and-start systems are designed to cause, in response to a driver's operation to restart the vehicle, a starter to crank the engine, thus restarting the engine.

In normal starters, a pinion is shifted by an actuator toward a ring gear coupled to a crankshaft of an engine to be engaged with the ring gear. While being meshed with the ring gear, the pinion is rotatably driven by a motor so that the crankshaft is rotated. This cranks the engine.

An example of engine start systems equipped with such a starter is disclosed in Kohyo (National Publication of Translated Version) No. 2008-51009. An engine start (restart) system disclosed in the Kohyo is provided with an electronic first switching element, such as a transistor, for turning on or off the supply of power to the starter motor. The engine start system is also provided with a second switching element for turning on or off the supply of power to the actuator.

Immediately before the engine speed reaches zero or after the engine speed has reached zero, the second switching element is controlled to be turned on. This causes the actuator of the starter to shift the pinion toward a ring gear of an engine so that the pinion is meshed with the ring gear.

After the engagement of the pinion with the ring gear, the first switching element is controlled to be turned on during a preset period. This causes the starter motor to rotate its pinion so that a rotational position (crank angle) of the crankshaft of the engine being off relative to a reference position is set to a target position (target crank angle) suitable for engine-restart. The crank angle of the engine being off relative to the reference position will be referred to as "engine-stop crank angle".

Thereafter, when an engine restart request occurs, the first switching element is controlled to be turned on so that the pinion being meshed with the ring gear is rotated by the starter motor. This cranks the crankshaft of the engine.

The techniques disclosed in the Kohyo are designed to turn the electronic first switching element on to thereby crank the engine in response to the occurrence of an engine restart request. Relatively high current, for example, within the range of 500 to 1500 amperes, is normally required for a starter motor to crank an engine. For this reason, a higher capacity (current capacity) power transistor through which such a relatively high current can flow needs to be provided as the electronic first switching element. However, because such a higher capacity power transistor is expensive, engine restart systems based on the techniques disclosed in the kohyo cannot meet the low-cost requirements for vehicles as recent important technical requirements.

In addition, electronic switching elements, such as power transistors, are normally operative to control the amount of a current to be supplied to the starter motor with high accuracy. However, mechanical relays, such as electromagnetic relays, cannot control the amount of a current to be supplied to the starter motor because the operation speed of electronic switching elements is faster than that of mechanical relays.

For this reason, if an inexpensive mechanical relay suitable for high-current supplying were provided in place of the first electronic switching element in the engine restart system disclosed in the kohyo, it would be difficult for the mechanical relay to control the amount of a current to be supplied to the starter motor with high accuracy. This would make difficult to set, with high accuracy, the engine-stop crank angle to the target crank angle suitable for engine-restart; this may deteriorate the restartability of the engine, such as reduce a time required to restart the engine.

SUMMARY OF THE INVENTION

In view of the circumstances set force above, an object of an aspect of the present invention is to provide systems for restarting an internal combustion engine; these systems are designed to improve the restartability of the internal combustion engine while meeting the low-cost requirement therefor.

According to one aspect of the present invention, there is provided a system for cranking, according to an occurrence of an engine restart request, a crankshaft of an internal combustion engine that has been automatically controlled for stop thereof in response to an engine automatic stop request to thereby restart the internal combustion engine, the crankshaft having a ring gear attached thereto. The system includes a starter provided with a motor working to, when energized, rotatably drive an output shaft with a pinion and an actuator working to, when energized, shift the pinion toward the ring gear to be engaged with the ring gear. The system includes a power supply electrically connected to the motor and operative to output electrical power, and a first mechanical relay electrically connected between the power supply and the motor and working to turn on and off a supply of a current based on the electrical power to the motor for rotating the pinion. The system includes a switching element electrically connected across the first mechanical relay and working to turn on and off the supply of the current to the motor for rotating the pinion.

The system according to the one aspect of the present invention is adapted to, when there is a need to control the motor with great accuracy without a need to supply a relatively high current, to cause the switching element to turn on and off the supply of the current to the motor using, for example, PWM control. This adjusts the amount of the current to be supplied to the motor with high accuracy.

In contrast, when there is a need to supply a relatively high current to the motor without the need for great accuracy of current control for the motor, the system according to the one aspect of the present invention is adapted to cause the first mechanical relay to turn on the supply of the current to the motor. This can supply a relatively high current to the motor to rotate the pinion, thus reliably cranking the crankshaft.

As described above, the system according to the one aspect of the present invention is adapted to reliably perform control of the starter associated with the restart of the engine.

This makes it possible to improve the restartability of the internal combustion engine while meeting the low-cost requirement for vehicles as recent important technical requirements.

According to another aspect of the present invention, there is provided a system for cranking a crankshaft of an internal combustion engine that has been stopped to thereby start the internal combustion engine, the crankshaft having a ring gear attached thereto. The system includes a starter provided with a motor working to, when energized, rotatably drive an output shaft with a pinion and an actuator working to, when energized, shift the pinion toward the ring gear to be engaged with the ring gear, and a power supply electrically connected to the motor and operative to output electrical power. The system includes a first mechanical relay electrically connected between the power supply and the motor and working to turn on and off a supply of a current based on the electrical power to the motor for rotating the pinion. The system includes a switching element electrically connected across the first mechanical relay and working to turn on and off the supply of the current to the motor for rotating the pinion, the switching element having a duty cycle representing a ratio of its on duration to a sum of its on duration and off duration. The system includes a motor-drive start unit configured to:

when starting a drive of the motor, gradually increase the duty cycle of the switching element while causing the first mechanical relay to turn off the supply of the current to the motor to thereby increase a voltage based on the electrical power of the power supply, the voltage being applied to the motor through the switching element;

after the increase in the voltage applied to the motor, cause the first mechanical relay to turn on the supply of the current to the motor; and after the first mechanical relay turning on the supply of the current to the motor, cause the switching element to turn off the supply of the current to the motor.

Referring to FIG. 8, when a mechanical relay is controlled to be on so that the current is supplied through the mechanical relay to the motor in order to crank an internal combustion engine in a conventional starting system, when the mechanical relay is switched from off state to on state in which the corresponding contacts are closed, the current to be supplied to the motor may abruptly increase. This may cause a large rush current to flow into the motor. If a large rush current caused to flow into the motor, the battery voltage would be greatly reduced. This would adversely affect on another electrical component, such as a car-navigation system, an audio system, a computer system, and the like.

In order to address such a problem, a system according to another aspect of the present invention is adapted to, when starting a drive of the motor, gradually increase the duty cycle of the switching element while causing the first mechanical relay to turn off the supply of the current to the motor to thereby increase a voltage based on the electrical power of the power supply, the voltage being applied to the motor through the switching element. Thereafter, the system is adapted to cause the first mechanical relay to turn on the supply of the current to the motor, and, after the first mechanical relay turning on the supply of the current to the motor, cause the switching element to turn off the supply of the current to the motor.

As described above, the system according to another aspect of the present invention is adapted to gradually increase the duty cycle of the switching element for starting the drive of the motor.

This prevents a large rush current from flowing into the motor when starting the supply of a current to the motor. This prevents the voltage form the power supply from being greatly reduced, making it possible to prevent the start of the supply of a current to the motor from adversely affecting another electrical component installed in the vehicle.

In addition, the engine starting system according to another aspect of the present invention is adapted to only temporarily shift the switching element to on state when starting the supply of a current to the motor. This does not require consideration of the thermal durability so much, making it possible to use a cheaper and compact switching element. Thus, the system according another aspect of the present invention meets the low-cost requirement for vehicles as recent important technical requirements.

BRIEF DESCRIPTION OF THE DRAWINGS

Other objects and aspects of the invention will become apparent from the following description of embodiments with reference to the accompanying drawings in which:

FIG. 3A is a flowchart schematically illustrating a starter control routine according to the first embodiment;

FIG. 3B is a flowchart schematically illustrating a pinion-preset subroutine according to the first embodiment;

DETAILED DESCRIPTION OF EMBODIMENTS OF THE INVENTION

Figure 1:
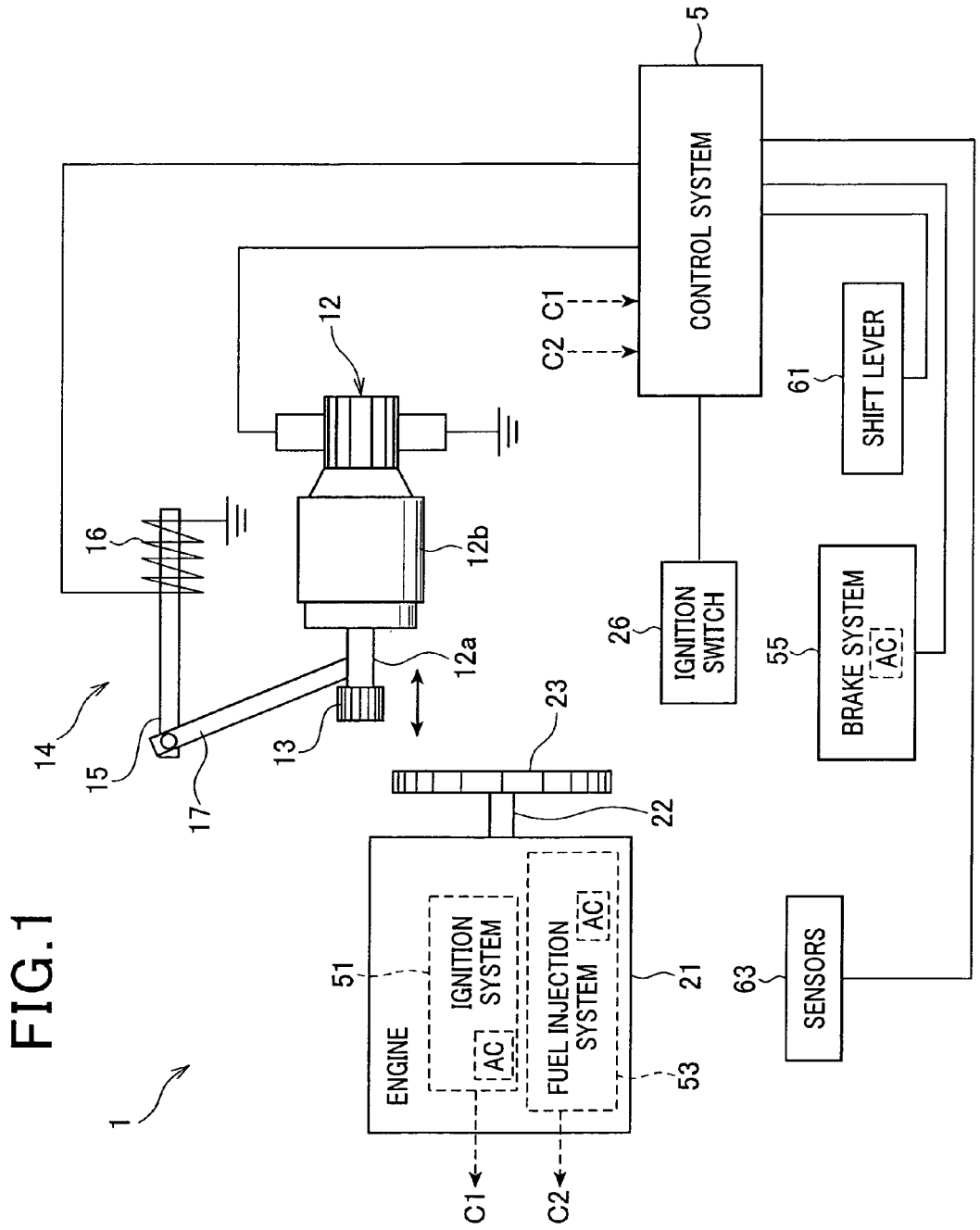
FIG. 1 is a view schematically illustrating an example of the overall hardware structure of an engine starting system according to the first embodiment of the present invention.

Embodiments of the present invention will be described hereinafter with reference to the accompanying drawings. In the drawings, identical reference characters are utilized to identify identical corresponding components.

First Embodiment

An engine starting system 1 for an internal combustion engine 21 installed in a vehicle according to the first embodiment of the present invention will be described hereinafter with reference to FIGS. 1 to 4B. The engine start system 1 includes a control system 5 for controlling overall operations of the vehicle.

The internal combustion engine, referred to simply as "engine", 21 has a crankshaft 22 with one end on which a ring gear 23 is mounted.

The engine 21 works to burn fuel within each cylinder thereof to thereby change the fuel energy to mechanical energy, such as rotative energy to thereby rotate the crankshaft 22. The rotation of the crankshaft 22 is transferred to driving wheels through a powertrain installed in the vehicle to thereby drive the vehicle.

In the vehicle, for controlling the engine 21, an ignition system 51 and a fuel injection system 53 are installed.

The ignition system 51 includes actuators, such as igniters, AC and causes the actuators AC to provide an electric current or spark to ignite an air-fuel mixture in each cylinder of the engine 21, thus burning the air-fuel mixture.

The fuel injection system 53 includes actuators, such as fuel injectors, AC and causes the actuators AC to spray fuel either directly into each cylinder of the engine 21 or into an intake manifold (or intake port) just ahead of each cylinder thereof to thereby burn the air-fuel mixture in each cylinder of the engine 21.

In addition, in the vehicle, for slowing down or stopping the vehicle, a brake system 55 is installed.

The brake system 55 includes, for example, disc or drum brakes as actuators AC at each wheel of the vehicle. The brake system 55 is operative to send, to each of the brakes, a deceleration signal indicative of a braking force to be applied from each brake to a corresponding one of the wheels in response to a brake pedal of the vehicle being depressed by the driver. This causes each brake to slow down or stop the rotation of a corresponding one of the wheels of the vehicle based on the sent deceleration signal.

Reference numeral 61 represents a hand-operable shift lever (select lever). When the vehicle is a manual transmission vehicle, the driver can change a position of the shift lever 61 to shift (change) a transmission gear ratio of the powertrain to thereby control the number of revolutions of the driving wheels and the torque generated by the engine 21 to the driving wheels. When the vehicle is an automatic transmission vehicle, the driver can change a position of the shift lever 61 to shift one of the drive ranges corresponding to a transmission gear ratio of the powertrain, such as Reverse range, Neutral range, Drive range, and the like.

In addition, in the vehicle, for measuring the operating conditions of the engine 21 and the driving conditions of the vehicle, sensors 63 are installed in the vehicle.

Each of the sensors 63 is operative to measure an instant value of a corresponding one parameter associated with the operating conditions of the engine 21 and/or the vehicle and to output, to the ECU 20, data indicative of the measured value of a corresponding one parameter.

Specifically, the sensors 63 include, for example, a crank angle sensor 27, an accelerator sensor (throttle position sensor), and a brake sensor electrically connected to the control system 5.

The crank angle sensor 27 is operative to output a pulse signal consisting a train of pulses; a pulse of the pulse signal appears every time the crankshaft 22 is rotated by a preset angle.

The accelerator sensor is operative to:

measure an actual position or stroke of a driver-operable accelerator pedal of the vehicle linked to a throttle valve for controlling the amount of air entering the intake manifold; and output, as data representing a driver's starting request, acceleration request, or deceleration request, for the engine 21, the measured actual stroke or position of the accelerator pedal.

The brake sensor is operative to measure an actual position or stroke of the brake pedal of the vehicle operable by the driver and to output, as data representing a driver's deceleration request, the measured actual stroke or position of the brake pedal.

Figure 2:
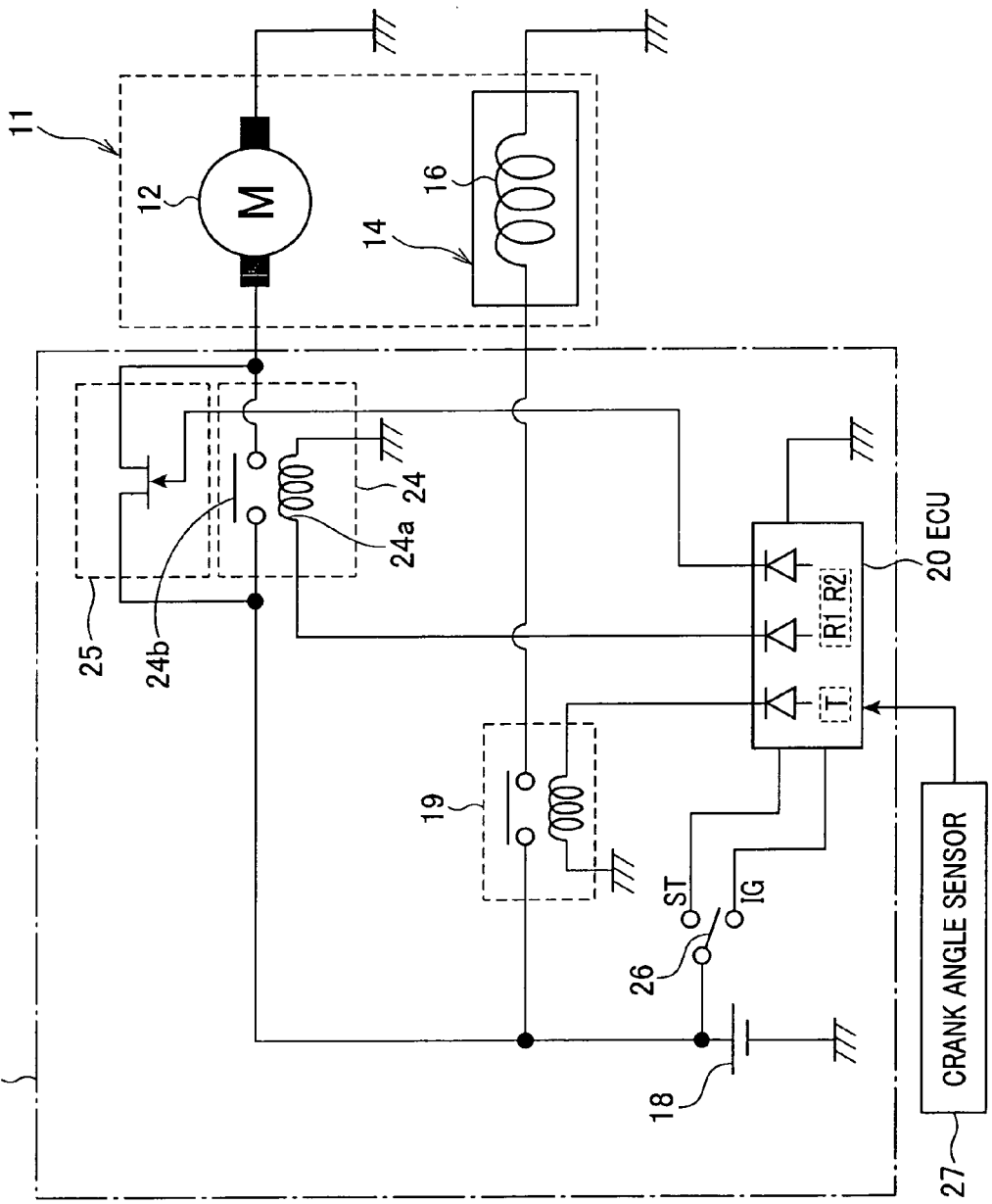
FIG. 2 is a schematic system configuration diagram of the engine starting system according to the first embodiment in which an internal combustion engine is omitted for the sake of simplification in illustration.

Referring to FIGS. 1 and 2, the engine starting system 1 includes a starter 11. The control system 5 includes a battery (power supply) 18, a relay 19, an ECU (Electronic Control System) 20, a mechanical relay 24, and an electronic switching element 25.

The starter 11 is designed as a pinion shift starter and provided with a starter motor 12, a pinion 13, and an electromagnetic actuator 14.

The starter motor 12 has an output shaft 12a and an armature 12b coupled thereto and operative to rotate the output shaft 12a when the armature 12b is energized.

The pinion 13 is mounted on the output shaft 12a to be shiftable in an axial direction of the output shaft 12a.

The starter motor 12 is arranged opposing the engine 21 such that the shift of the pinion 13 in the axial direction of the output shaft 12a toward the engine 21 allows the pinion 13 to abut on the ring gear 23 of the engine 21.

The electromagnetic actuator, referred to simply as "actuator", 14 is made up of a plunger 15, a solenoid 16, and a shift lever 17. The plunger 15 is so arranged in parallel to the axial direction of the output shaft 12a of the starter motor 12 as to be shiftable in its length direction parallel to the axial direction of the output shaft 12a.

The solenoid 16 is arranged to surround the plunger 15. One end of the solenoid 16 is electrically connected to a positive terminal of the battery 18 via the relay 19, and the other end thereof is grounded. The shift lever 17 has one end and the other end in its length direction. The one end of the shift lever 17 is pivotally coupled to one end of the plunger 15, and the other end thereof is coupled to the output shaft 12a. The shift lever 17 is pivoted about a pivot located at its substantially center in the length direction.

The solenoid 16 is operative to shift the plunger 15 thereinto in its length direction so as to pull it thereinto against the force of a return spring (not shown) when energized. The pull-in shift of the plunger 15 pivots the shift lever 17 clockwise in FIG. 1 whereby the pinion 13 is shifted toward the ring gear 23 of the engine 21 via the shift lever 17. This allows the pinion 13 to be meshed with the ring gear 23 for cranking the engine 21. When the solenoid 16 is deenergized, the return spring returns the plunger 15 and the shift lever 17 to their original positions illustrated in FIG. 1 so that the pinion 13 is pulled-out of mesh with the ring gear 23 so as to return its original position illustrated in FIG. 1.

The relay 19 is designed as, for example, a mechanical relay. The relay 19 consists of, for example, a solenoid 19a and a switch 19b. One end of the solenoid 19a is electrically connected to the ECU 20, and the other thereof is grounded.

The switch 19b is electrically connected between the positive terminal of the battery 18 and the solenoid 16 of the actuator 14. The switch 19b is turned on by magnetic force generated when the solenoid 19a is energized by the ECU 20, thus establishing electrical conduction between the solenoid 16 and the battery 18. This allows the battery 18 to supply electrical power, such as a DC (Direct Current) battery voltage, to the solenoid 16.

In contrast, the switch 19b is turned off when the solenoid 19a is deenergized by the ECU 20, thus interrupting the electrical conduction between the solenoid 16 and the battery 18. This deenergizes the solenoid 16.

The mechanical relay 24 has a predetermined first current capacity and consists of, for example, a solenoid 24a and a switch 24b. One end of the solenoid 16 is electrically connected to the ECU 20, and the other thereof is grounded.

The switch 24b is electrically connected between the positive terminal of the battery 18 and the armature 12b of the starter motor 12. The switch 24b is turned on by magnetic force generated when the solenoid 24a is energized by the ECU 20, thus establishing electrical conduction between the armature 12b and the battery 18.

In contrast, the switch 24b is turned off when the solenoid 24a is deenergized by the ECU 20, thus interrupting the electrical conduction between the armature 12b and the battery 18. This stops the rotation of the armature 12b and therefore stops the rotation of the pinion 13.

The electronic switching element, such as a transistor (N-channel JFET), 25 has a predetermined second current capacity lower than the first current capacity of the mechanical relay 24. The transistor 25 is electrically connected across the mechanical relay 24.

Specifically, the drain (input terminal) of the transistor 25 is electrically connected to the positive terminal of the battery 18, and the source (output terminal) thereof is electrically connected to the armature 12b of the motor 12. The gate (control terminal) of the transistor 25 is electrically connected to the ECU 20.

For example, when an electric signal, such as a pulse signal with a pulse width (pulse duration) corresponding to the energization duration (on period) of the transistor 25, is sent from the ECU 20, the transistor 25 establishes, during on period of the pulse signal, electric conduction between the drain and source to thereby allow the battery 18 to supply a current to the armature 12b of the motor 12.

The transistor 25 also interrupts, during off period of the pulse signal, the electric conduction between the drain and source to thereby interrupt the current from the battery 18 to the armature 12b.

A duty cycle of the transistor 25 (starter motor 12) is represented as a ratio, in percent, of the on period (pulse width) of the pulse signal to the repetition interval (sum of the on and off periods) thereof. The ECU 20 is programmed to control the duty cycle of the starter motor 12 to thereby adjust the amount of the current to be supplied from the battery 18 to the motor 12.

An ignition/starter switch 26 is provided in the vehicle and electrically connected between the positive terminal of the battery 18 and the ECU 20. For example, when an ignition key of the vehicle is inserted in a key cylinder thereof to be operated by the driver to an ignition position, the ignition/starter switch 26 is turned on so that the DC power voltage is applied to the ECU 20 from the battery 18. This activates the ECU 20.

When the ignition key is changed from the ignition position to a start position by the driver, a starter ON signal is transmitted from the battery 18 to the ECU 20. In other words, when the ignition key is changed from the ignition position to the start position by the driver, a starter ON command is turned from off to on. This causes the ECU 20 to turn the mechanical relay 19 and the mechanical relay 24 on, thus energizing the solenoid 16 and the motor 12, respectively.

In contrast, when the ignition key is changed from the start position to another position by the driver, the supply of the starter ON signal from the battery 18 to the ECU 20 is stopped. In other words, when the ignition key is changed from the start position to another position by the driver, the starter ON command is turned from on to off. This causes the ECU 20 to turn the mechanical relay 19 and the mechanical relay 24 off, thus deenergizing the solenoid 16 and the motor 12, respectively.

The ECU 20 is designed as, for example, a normal microcomputer circuit consisting of, for example, a CPU, a storage medium 20a including a ROM (Read Only Memory), such as a rewritable ROM, a RAM (Random Access Memory), and the like, an 10 (Input and output) interface, and so on.

The storage medium 20a stores therein beforehand various engine control programs.

The ECU 20 is operative to:
receive pieces of data measured by the sensors 63 and sent therefrom; and
control, based on the operating conditions of the engine 21 determined by at least some of the received pieces of data measured by the sensors 63, various actuators AC installed in the engine 21 to thereby adjust various controlled variables of the engine 21.

For example, the ECU 20 is operative to determine, based on the pulse signal outputted from the crank angle sensor 27, a rotational position (crank angular position) of the crankshaft 22 relative to a reference position and a speed of the engine, referred to simply as "engine speed".

Specifically, the ECU 20 is programmed to:
compute a proper ignition timing for the igniter AC for each cylinder, a proper fuel injection liming and a proper injection quantity for the fuel injector AC for each cylinder;
instruct the igniter AC for each cylinder to ignite an air-fuel mixture in each cylinder at a corresponding computed proper ignition timing; and
instruct the fuel injector AC for each cylinder to spray, at a corresponding computed proper injection timing, a corresponding computed proper quantity of fuel into each cylinder.

In addition, the engine control programs stored in the storage medium 20a include an engine automatic stop-and-start routine (program) R1. The ECU 20 repeatedly runs the engine automatic stop-and-start routine R1 in a given cycle during its being energized to carry out an engine automatic stop-and-start control task T, in other words, idle reduction control task T.

Specifically, in accordance with the engine automatic stop-and start control routine R1, the ECU 20 repetitively determines whether an engine automatic stop request occurs based on the data measured by the sensors 63.

When the driver operates the accelerator pedal to fully close the throttle valve or operates the brake pedal to thereby send a deceleration request to the ECU 20 during the vehicle running, the ECU 20 detects the driver's deceleration request operation based on the data measured by the accelerator sensor or the brake sensor. Then, the ECU 20 determines that the engine automatic stop request occurs. Moreover, when the vehicle is stopped, the ECU 20 determines that the engine automatic stop request occurs.

Then, the ECU 20 carries out an automatic stop control of the engine 21. Specifically, the'ECU 20 controls the ignition system 51 and/or the fuel injection system 53 to stop the burning of the air-fuel mixture in each cylinder. The stop of the burning of the air-fuel mixture in each cylinder of the engine 21 means the automatic stop of the engine 21.

After the automatic stop of the engine 21, in accordance with the engine automatic stop-and start control routine R1, the ECU 20 determines whether an engine restart request occurs based on the data measured by the sensors 63 and data inputted from another device installed in the vehicle.

When the engine automatic stop request is released during the vehicle running, for example, the throttle valve is shifted from the fully close position, the ECU 20 determines that the engine restart request occurs. Moreover, when the driver, for example, releases the brake pedal or operates the shift lever 61 in preparation to the restart of the vehicle during the vehicle being stopped, the ECU 20 determines that the engine restart request occurs. In addition, the driver, for example, depresses the accelerator pedal to restart the vehicle, the ECU 20 determines that the engine restart request occurs.

When determining that the engine restart request occurs, the ECU 20 is programmed to determine that the starter ON command is switched from off to on, and automatically restart the engine 21.

In order to smoothly restart the engine 21 immediately in response to the occurrence of an engine restart request, the ECU 20 is programmed to carry out a starter-control routine R2 during the engine speed being reduced by the engine automatic stop-and start control routine R1; this starter-control subroutine R2 is illustrated in FIGS. 1 and 3A.

At first, the ECU 20 is programmed to carry out a pinion-preset subroutine R2a. In the pinion-preset subroutine R2a, the ECU 20 monitors the engine speed that is gradually reduced during the engine automatic stop control. When the monitored engine speed reaches zero or a preset speed, the ECU 20 turns the mechanical relay 19 on to thereby energize the solenoid 16 of the actuator 14. This shifts the pinion 13 toward the ring gear 23 so as to be meshed therewith.

After the completion of the pinion-preset subroutine R2a, the ECU 20 carries out an engine-stop position adjustment subroutine R2b.

In the engine-stop position adjustment subroutine R2b, the ECU 20 supplies the pulse signal to the transistor 25 to thereby turn the transistor 25 on and off while modulating the pulse width (on period) of the pulse signal, in other words, changing the duty cycle of the transistor 25 in PWM control mode. This adjusts the amount of the current to be supplied to the armature 12b of the motor 12 from the battery 18, thus adjusting the rotational position (crank angle) of the crankshaft 22 of the engine 21 being off relative to the reference position to a target position (target crank angle) suitable for engine-restart.

After the completion of the engine-stop position adjustment routine R2b, when an engine restart request occurs, the ECU 20 is programmed to carry out an engine-restart subroutine R2c. In the engine-restart subroutine R2c, the ECU 20 energizes the solenoid 24a of the mechanical relay 24 to turn the switch 24b on. This establishes electrical connection between the battery 18 and the motor 12 to rotate the motor 12 (pinion 13). Because the pinion 13 has been meshed with the ring gear 23, the rotation of the pinion 13 cranks the crankshaft 22 of the engine 21 to thereby restart the engine 21.

Next, specific operations in the starter-control routine R2 (subroutines R2a, R2b, and R2c) to be executed by the ECU 20 will be described hereinafter with reference to FIGS. 3B, 4A, and 4B.

As described above, the starter-control routine R2 is repeatedly called in a given cycle during execution of the engine automatic stop-and start control.

When the starter-control routine R2 is called, the ECU 20 determines whether the pinion-preset subroutine R2a has been completed in step 100 of FIG. 3A.

Upon determining that the pinion-preset subroutine has not been completed yet (NO in step 100), the ECU 20 proceeds to step 101 and executes the pinion-preset subroutine R2a in step 101 to thereby carry out a pinion-preset engagement task.

Specifically, in the pinion-preset subroutine R2a, the ECU 20 determines whether the monitored engine speed based on the outputted pulse signal from the crank angle sensor 27 reaches zero or the preset speed in step 111 of FIG. 3B.

Upon determining that the monitored engine speed does not reach zero or the preset speed (NO in step 111), the ECU 20 exits the pinion-preset subroutine R2a and returns the main routine R1.

Otherwise, upon determining that the monitored engine speed reaches zero or the preset speed (YES in step 111), the ECU 20 turns the mechanical relay 19 on to thereby activate the solenoid 16 of the actuator 14 in step 112. This shifts the pinion 13 toward the ring gear 23 so as to be meshed therewith.

Thereafter, the ECU 20 proceeds to step 101a of FIG. 3A.

Otherwise, upon determining that the pinion-preset subroutine has been completed yet (YES in step 100), the ECU 20 proceeds to step 101a.

In step 101a, the ECU 20 determines whether the engine-stop position adjustment subroutine R2b has been completed.

Upon determining that the engine-stop position adjustment subroutine R2b has not been completed yet (NO in step 101a), the ECU 20 proceeds to step 102 and executes the engine-stop position adjustment subroutine R2b in step 102 to thereby carry out an engine-stop position adjustment task.

Specifically, in the engine-stop position adjustment subroutine R2b, the ECU 20 supplies the pulse signal to the transistor 25 to thereby turn the transistor 25 on and off while modulating the pulse width (on period) of the pulse signal, in other words, changing the duty cycle of the transistor 25 in PWM control mode in step 202. This adjusts the amount of the current to be supplied to the armature 12b of the motor 12 from the battery 18 within the range lower than the second current capacity, thus adjusting the rotational position (crank angle) of the crankshaft 22 of the engine 21 being off relative to the reference position to the target position (target crank angle) suitable for engine-restart.

Thereafter, the ECU 20 determines whether the monitored rotational position (crank angle) of the crankshaft 22 relative to the reference position based on the outputted pulse signal from the crank angle sensor 27 reaches the target position (target crank angle) in step 203.

Upon determining that the monitored rotational position (crank angle) of the crankshaft 22 relative to the reference position does not reach the target position (target crank angle) (NO in step 203), the ECU 20 repeatedly executes the rotational position (crank-angle) adjustment operation in step 202.

Otherwise, upon determining that the monitored rotational position (crank angle) of the crankshaft 22 relative to the reference position reaches the target position (target crank angle) (YES in step 203), the ECU 20 stops the supply of the pulse current to the transistor 25 in step 204.

Thereafter, the ECU 20 proceeds to step 103 of FIG. 3A.

Otherwise, upon determining that the engine-stop position adjustment subroutine R2b has been completed yet (YES in step 101a0, the ECU 20 proceeds to step 103.

Figure 4A:
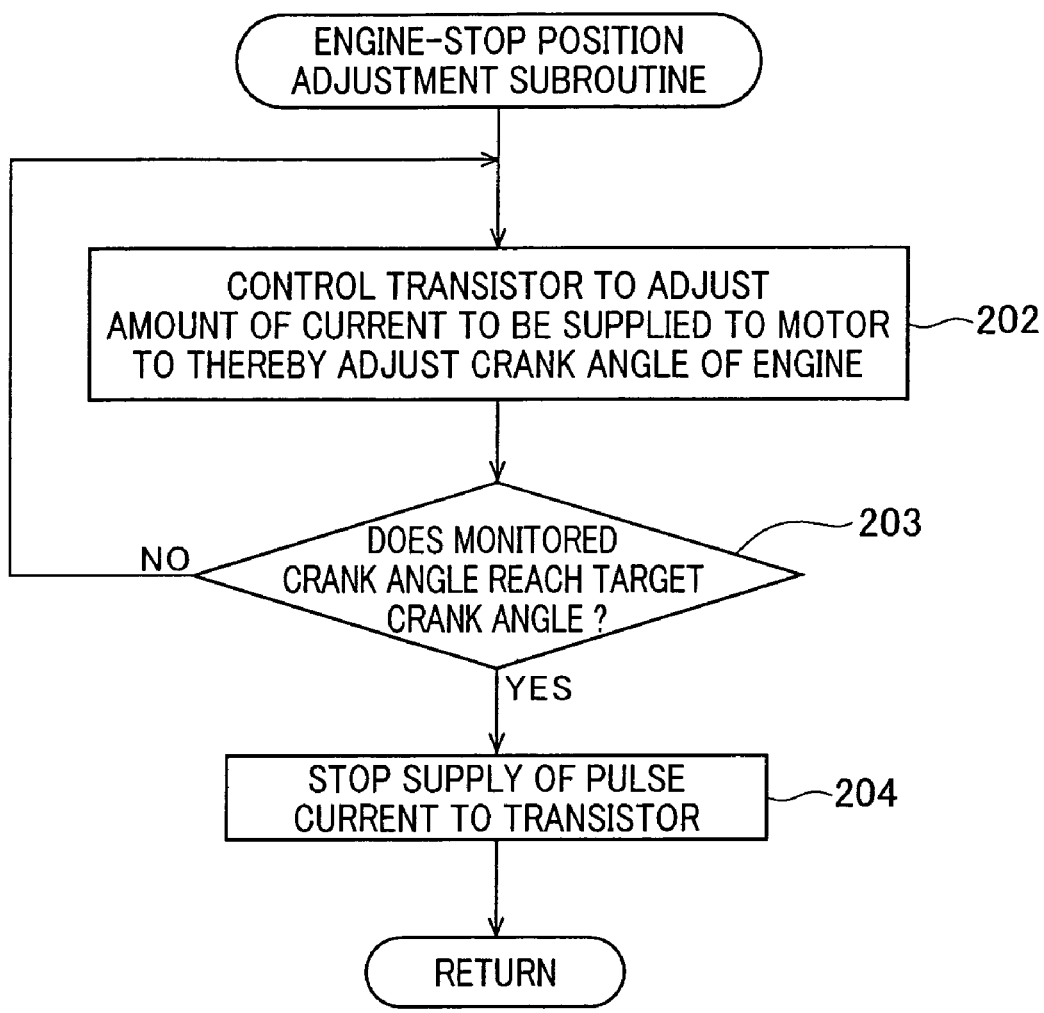
FIG. 4A is a flowchart schematically illustrating an engine-stop position adjusting subroutine according to the first embodiment.
Figure 4B:
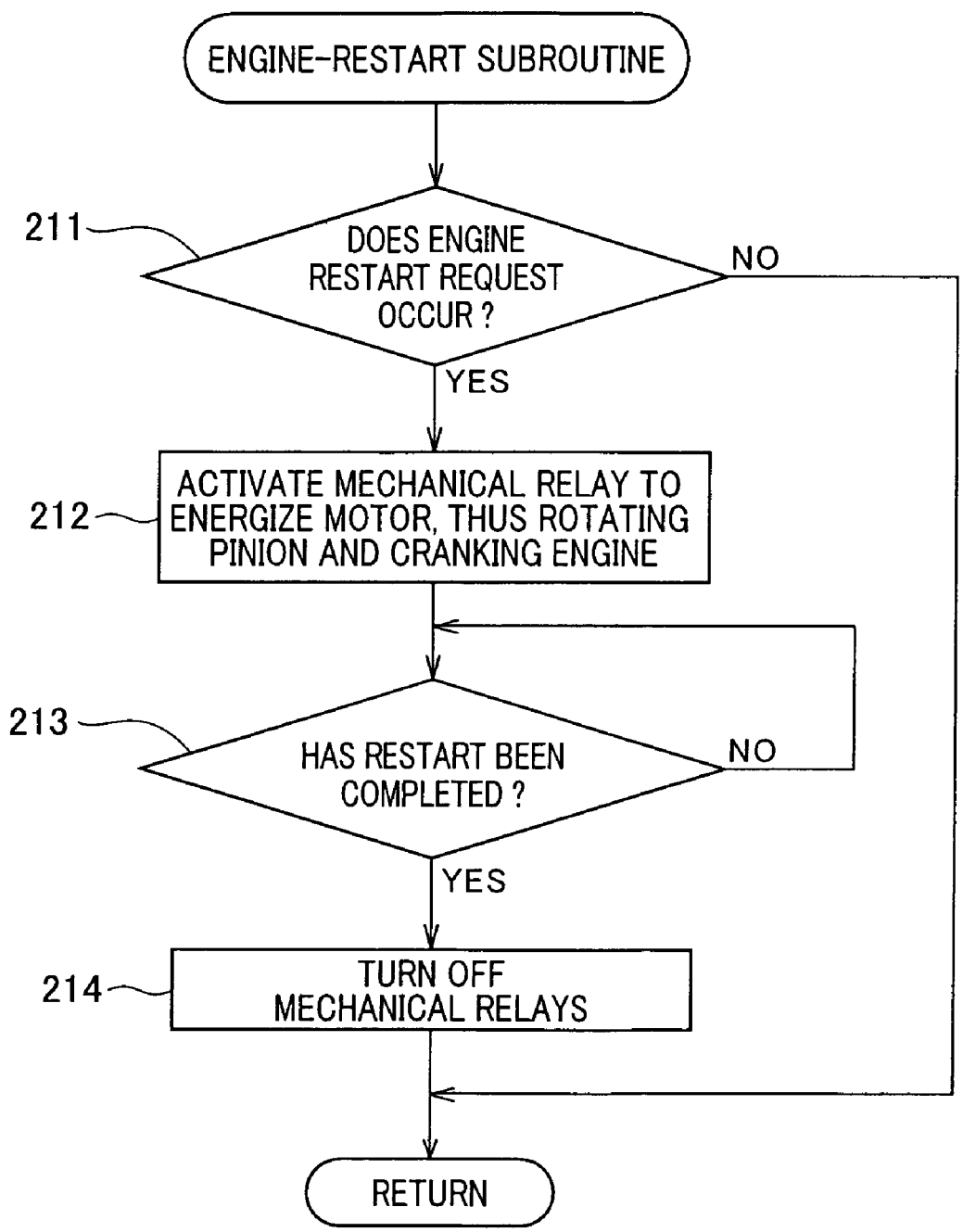
FIG. 4B is a flowchart schematically illustrating an engine-restart subroutine according to the first embodiment.

In step 103, the ECU 20 executes the engine-restart subroutine R2c in step 103 of FIG. 4B to thereby carry out an engine-restart task.

Specifically, in the engine-restart subroutine R2c, the ECU 20 determines whether an engine restart request occurs based on the data measured by the sensors 63 and data inputted from another device installed in the vehicle set forth above in step 211.

Upon determining that an engine restart request does not occur (NO in step 211), the ECU 20 exits the engine-restart subroutine R2c and returns to the main routine R1.

Otherwise, upon determining that an engine restart request occurs (YES in step 211), the ECU 20 determines that the starter ON command is turned from off to on. Then, the ECU 20 energizes the solenoid 24a of the mechanical relay 24 to turn the switch 24b on. This establishes electrical connection between the battery 18 and the motor 12 to rotate the motor 12 (pinion 13). Because the pinion 13 has been meshed with the ring gear 23, the rotation of the pinion 13 cranks the crankshaft 22 of the engine 21 to thereby restart the engine 21 in step 212.

Thereafter, in step 213, the ECU 20 determines whether the restart of the engine 21 has been completed. For example, in step 213, the ECU 20 determines whether the monitored engine speed exceeds a preset speed for determination of restart completion. Upon determining that the engine speed does not exceed the preset speed for determination of restart completion (NO in step 213), the ECU 20 determines that the restart of the engine 21 has not been completed yet. Then, the ECU 20 repeatedly is carries out the determination in step 213.

When the engine speed reaches or exceeds the preset speed for determination of restart completion based on the operation in step 212, the determination in step 213 is YES. Then, the ECU 20 determines that the restart of the engine 21 has been completed, in other words, determines that the starter ON command is turned from on to off. Thus, the ECU 20 turns off the mechanical relays 24 and 19 in step 214, and thereafter, exits the engine-restart subroutine R2c and returns to the main routine R1. The turning off of the relays 24 and 19 stops the rotation of the pinion 13 (motor 12) and returns the pinion 13 to its original position by the force of the return spring.

As described above, the engine starting system 1 according to the first embodiment is provided with the mechanical relay 24 for switching energization and deenergization of the motor 12, and with the electronic switching element (transistor) 25 provided across the mechanical relay 24 and operative to turn on and off the supply of power to the motor 12. The first current capacity of the mechanical relay 24 is greater than the second current capacity of the transistor 25.

Thus, when executing the engine-stop position adjustment task that requires great accuracy of current control for the motor 12 without the need to supply a relatively high current, such as within the range of 500 to 1500 amperes, the ECU 20 supplies the pulse signal to the transistor 25 on and off while modulating the pulse width (on period) of the pulse signal in PWM control mode. This adjusts the amount of the current to be supplied to the motor 12 with high accuracy within the range lower than the second current capacity, such as no more than tens of amperes, preferably, a range from 20 to 80 amperes, thus adjusting the crank angle of the crankshaft 22 relative to the reference position to the target crank angle with high accuracy.

In contrast, when executing the engine-restart task that requires the supply of a relatively high current, such as within the range of 500 to 1500 amperes, to the motor 12 without the need for great accuracy of current control for the motor 12, the ECU 20 energizes the solenoid 24a of the mechanical relay 24 to turn the switch 24b on. This can supply a relatively high current to the motor 12 to rotate the motor 12 (pinion 13), thus reliably cranking the crankshaft 22 of the engine 21.

As described above, the engine starting system 1 according to the first embodiment is adapted to reliably perform the engine-stop position adjustment task and the engine-restart task using such a low current-capacity electronic switching element (transistor 25). In other words, the engine starting system 1 according to the first embodiment is adapted to reliably perform the engine-stop position adjustment task and the engine-restart task without using an expensive high current-capacity electronic switching element.

This makes it possible to improve the restartability of the engine 21 while meeting the low-cost requirement for vehicles as recent important technical requirements.

Second Embodiment

An engine starting system for the engine 21 according to the second embodiment of the present invention will be described hereinafter with reference to FIGS. 5 and 6.

The hardware and software structures of the engine starting system according to the second embodiment are substantially identical to those of the engine starting system 1 according to the first embodiment except for the following points. So, like parts between the engine starting systems according to the first and second embodiments, to which like reference characters are assigned, are omitted or simplified in description.

Figure 5:
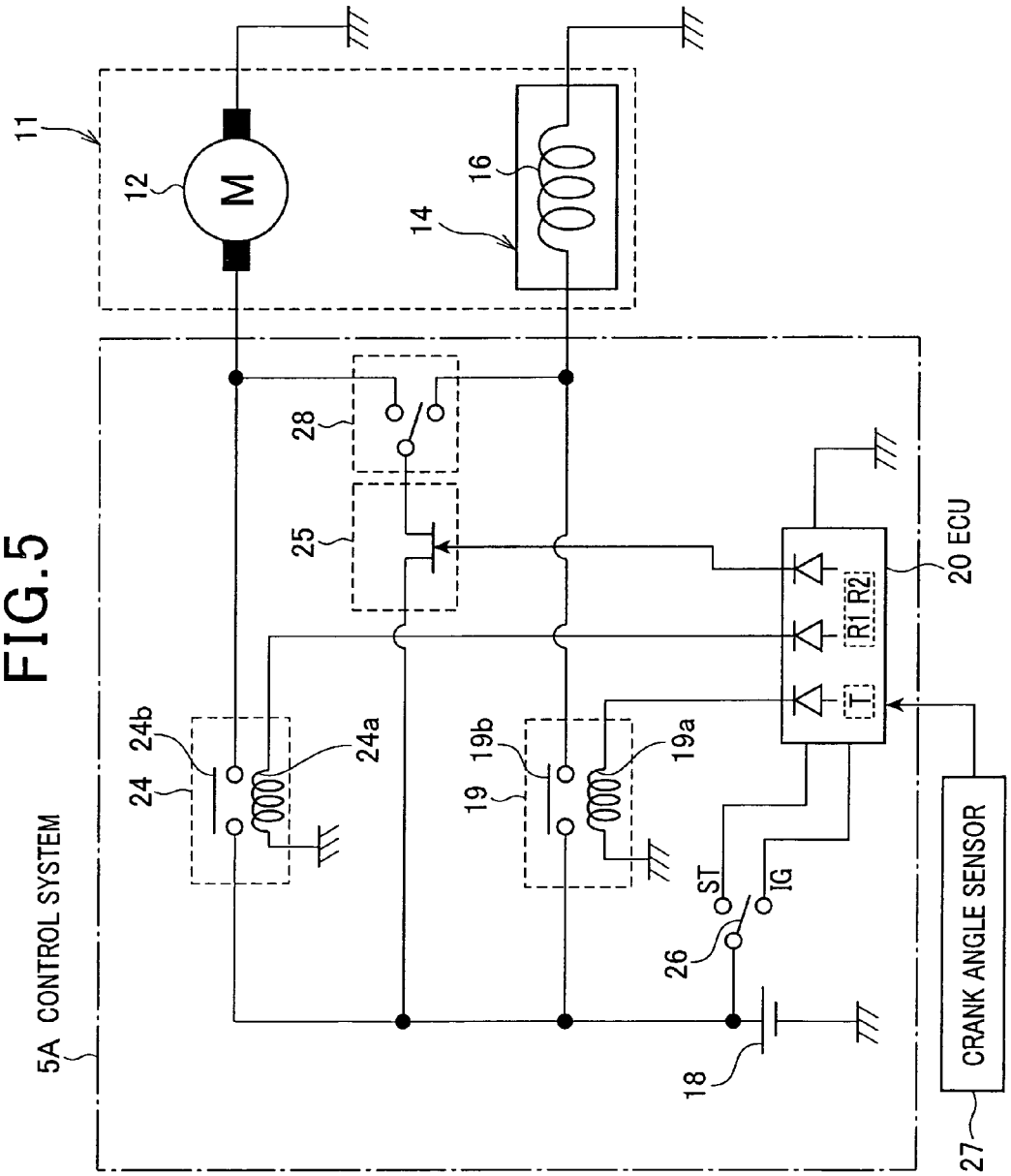
FIG. 5 is a schematic system configuration diagram of the engine starting system according to the second embodiment of the present invention.

Referring to FIG. 5, the engine starting system according to the second embodiment is further provided with a circuit selecting unit 28 placed between the transistor 25 and the starter 11 (each of the motor 12, and the actuator 14).

Specifically, the circuit selecting unit 28 includes a movable first contact 28a, and stationary second and third contacts 28b, and 28c.

The first contact 28a is conductively connected to the source of the transistor 25, the second contact 28b is conductively connected to a point on a connection line between the switch 24b of the mechanical relay 24 and the motor 12. The third contact 28c is conductively connected to a point on a connection line between the solenoid 16 of the actuator 14 and the positive terminal of the battery 18. The circuit selecting unit 28 is configured such that the first contact 28a is selectively connected to any one of the second and third contacts 28b and 28c.

That is, when the first contact 28a is controlled by the ECU 20 to be connected to the first contact 28a, this provides a first parallel circuit (motor control circuit) consisting of the mechanical relay 24 and the transistor 25 parallely connected to each other. When the first contact 28a is controlled by the ECU 20 to be connected to the second contact 28b, this provides a second parallel circuit (actuator control circuit) consisting of the transistor 25 and the mechanical relay 19 parallely connected to each other.

The first parallel circuit is operative to control a current to be supplied to the motor 12 by turning on and off the transistor 25. The second parallel circuit is operative to control a current to be supplied to the solenoid 16 of the actuator 14 by turning on and off the transistor 25.

In the second embodiment, upon determining that the pinion-preset subroutine has not been completed yet (NO in step 100), the ECU 20 proceeds to step 101 and executes the pinion-preset subroutine in step 101, which is different from the pinion-preset subroutine R2a illustrated in FIG. 3B, to thereby carry out the pinion-preset engagement task.

Figure 6:
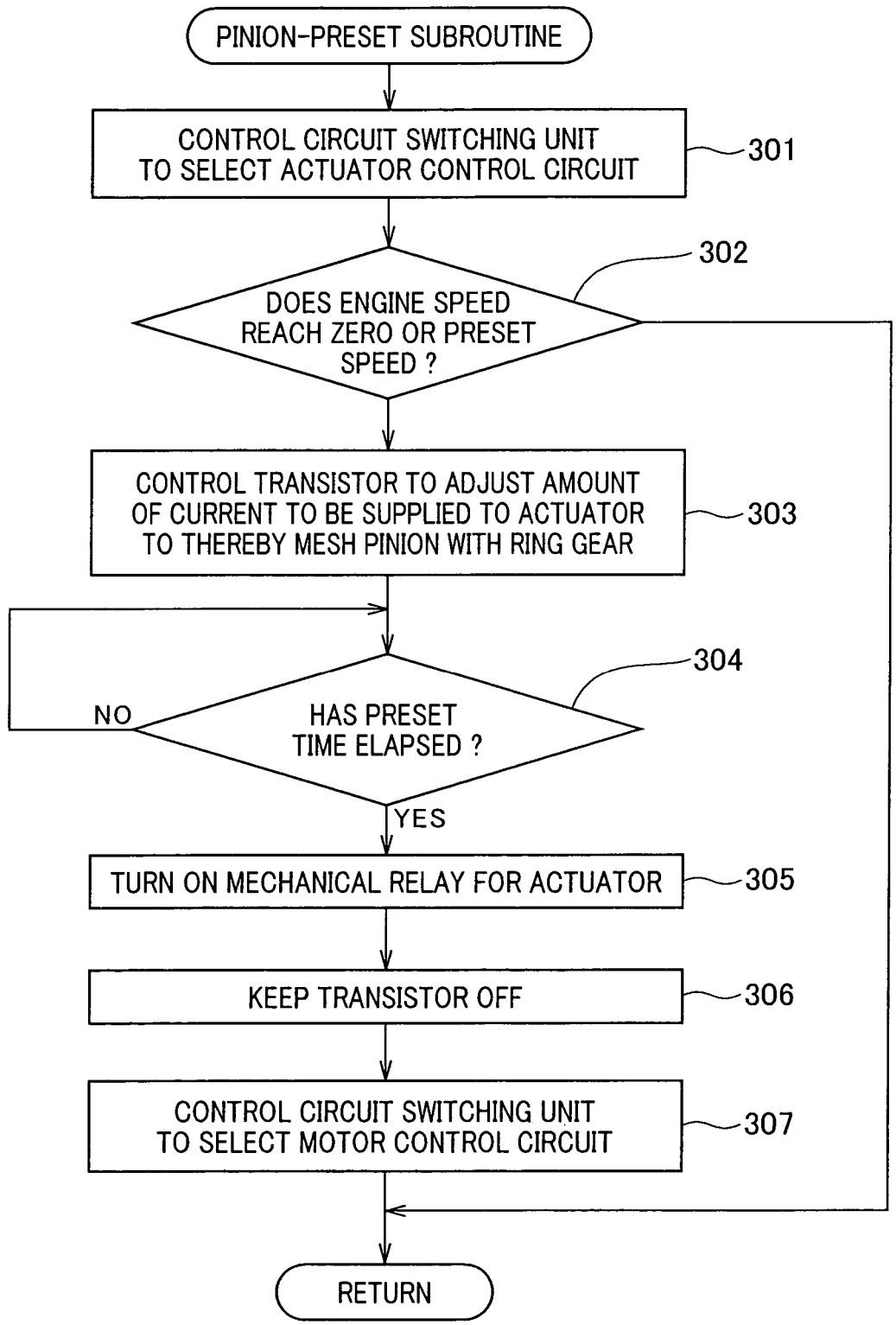
FIG. 6 is a flowchart schematically illustrating a pinion-preset subroutine according to the second embodiment.

Specifically, when launching the pinion-preset subroutine according to the second embodiment, the ECU 20 controls the circuit selecting unit 28 such that the first contact 28a is connected to the third contact 28c in step 301 of FIG. 6. This provides the second parallel circuit consisting of the transistor 25 and the mechanical relay 19 parallely connected to each other.

Next, the ECU 20 determines whether the monitored engine speed based on the outputted pulse signal from the crank angle sensor 27 reaches zero or the preset speed in step 302.

Upon determining that the monitored engine speed does not reach zero or the preset speed (NO in step 302), the ECU 20 exits the pinion-preset subroutine and returns the main routine R1.

Otherwise, upon determining that the monitored engine speed reaches zero or the preset speed (YES in step 302), the ECU 20 supplies the pulse signal to the transistor 25 to thereby turn the transistor 25 on and off while modulating the pulse width (on period) of the pulse signal, in other words, changing the duty cycle of the transistor 25 in PWM control mode in step 303. For example, the ECU 20 changes the duty cycle of the transistor 25 to a relatively low level, thus slowly shifting the pinion 13 toward the ring gear 23 so as to be smoothly meshed therewith.

Thereafter, the ECU 20 proceeds to step 304 and determines whether a preset time has elapsed since the start of supplying the current to the solenoid 16 of the actuator 14 in step 304.

Upon determining that the preset time has not elapsed since the start of supplying the current to the solenoid 16 of the actuator 14 (NO in step 304), the ECU 20 repeats the determination in step 304.

Otherwise, upon determining that the preset time has elapsed since the start of supplying the current to the solenoid 16 of the actuator 14 (YES in step 304), the ECU 20 determines that the pinion 13 is engaged with the ring gear 23, then proceeding to step 305. In step 305, the ECU 20 turns the mechanical relay 19 on to thereby maintain that the pinion 13 is being meshed with the ring gear 23.

Note that, in step 304, the ECU 20 can determine whether the pinion 13 is actually engaged with the ring gear 23, and upon determining that the pinion 13 is actually engaged with the ring gear 23, the ECU 20 can turn the mechanical relay 19 on to thereby maintain that the pinion 13 is being meshed with the ring gear 23. In this modification, it is preferable that the sensors 63 includes a sensor electrically connected to the ECU 20 and arranged to check whether the pinion 13 is actually engaged with the ring gear 23.

That is, the ECU 20 can determine that the pinion 13 is actually engaged with the ring gear 23 when data indicative of the actual engagement of the pinion 13 and the ring gear 23 is sent from the sensor.

Thereafter, the ECU 20 proceeds to step 306 and keeps the transistor 25 off in step 306, and controls the circuit selecting unit 28 such that the first contact 28a is connected to the second contact 28b in step 307. This provides the first parallel circuit consisting of the mechanical relay 24 and the transistor 25 parallely connected to each other. Thereafter, the ECU 20 proceeds to step 101a of FIG. 3A.

In step 101a, the ECU 20 determines whether the engine-stop position adjustment subroutine R2b has been completed.

Upon determining that the engine-stop position adjustment subroutine R2b has not been completed yet (NO in step 101a), the ECU 20 supplies the pulse signal to the transistor 25 to thereby turn the transistor 25 on and off while modulating the pulse width (on period) of the pulse signal in PWM control mode (see FIG. 4A). This adjusts the amount of current to be supplied to the armature 12b of the motor 12 from the battery 18, thus adjusting, with high accuracy, the rotational position (crank angle) of the crankshaft 22 of the engine 21 being off relative to the reference position to the target position (target crank angle) suitable for engine-restart.

Thereafter, as described above, the ECU 20 energizes the solenoid 24a of the mechanical relay 24 to turn the switch 24b on (see FIG. 4B). This establishes electrical connection between the battery 18 and the motor 12 to rotate the motor 12 (pinion 13). Because the pinion 13 has been meshed with the ring gear 23, the rotation of the pinion 13 cranks the crankshaft 22 of the engine 21 to thereby restart the engine 21.

As described above, the engine starting system according to the second embodiment is additionally configured such that the circuit selecting unit 28 selects any one of:

the first parallel circuit for controlling a current to be supplied to the motor 12 by turning on and off the transistor 25; and the second parallel circuit for controlling a current to be supplied to the solenoid 16 of the actuator 14 by turning on and off the transistor 25.

This allows one transistor 25 to control a current to be supplied to the motor 12 and that to be supplied to the actuator 14. Thus, in addition to the advantages achieved by the first embodiment, the configuration of the engine starting system according to the second embodiment reduces its cost as compared with a configuration of an engine starting system using different switching elements for individually controlling a current to be supplied to the motor 12 and that to be supplied to the actuator 14.

In addition, the engine starting system according to the second embodiment is configured to, in the pinion-preset task, slowly shift the pinion 13 toward the ring gear 23 to be smoothly meshed with the ring gear 23. Thereafter, the engine starting system according to the second embodiment is configured to turn the mechanical relay 19. This allows a relatively high current to be supplied to the actuator 14 via the mechanical relay 19, thus reliably maintaining that the pinion 13 is being meshed with the ring gear 23.

Third Embodiment

An engine starting system for the engine 21 according to the third embodiment of the present invention will be described hereinafter with reference to FIG. 7.

The hardware and software structures of the engine starting system according to the third embodiment are substantially identical to those of the engine starting system 1 according to the first embodiment except for the following points. So, like parts between the engine starting systems according to the first and third embodiments, to which like reference characters are assigned, are omitted or simplified in description.

For restarting the engine 21, the mechanical actuator 24 is turned on so that a current is supplied from the battery 18 to the motor 12. In this case, when the rotational speed of the motor 12 is increased from zero in which the motor 12 is off, in other words, a torque load applied to the motor 12 is high, the amount of the current to be supplied to the motor 12 may greatly increase. This may greatly reduce the battery voltage immediately after the start of the supply of a current to the motor 12; this may adversely affect on another electrical component installed in the vehicle.

Figure 7:
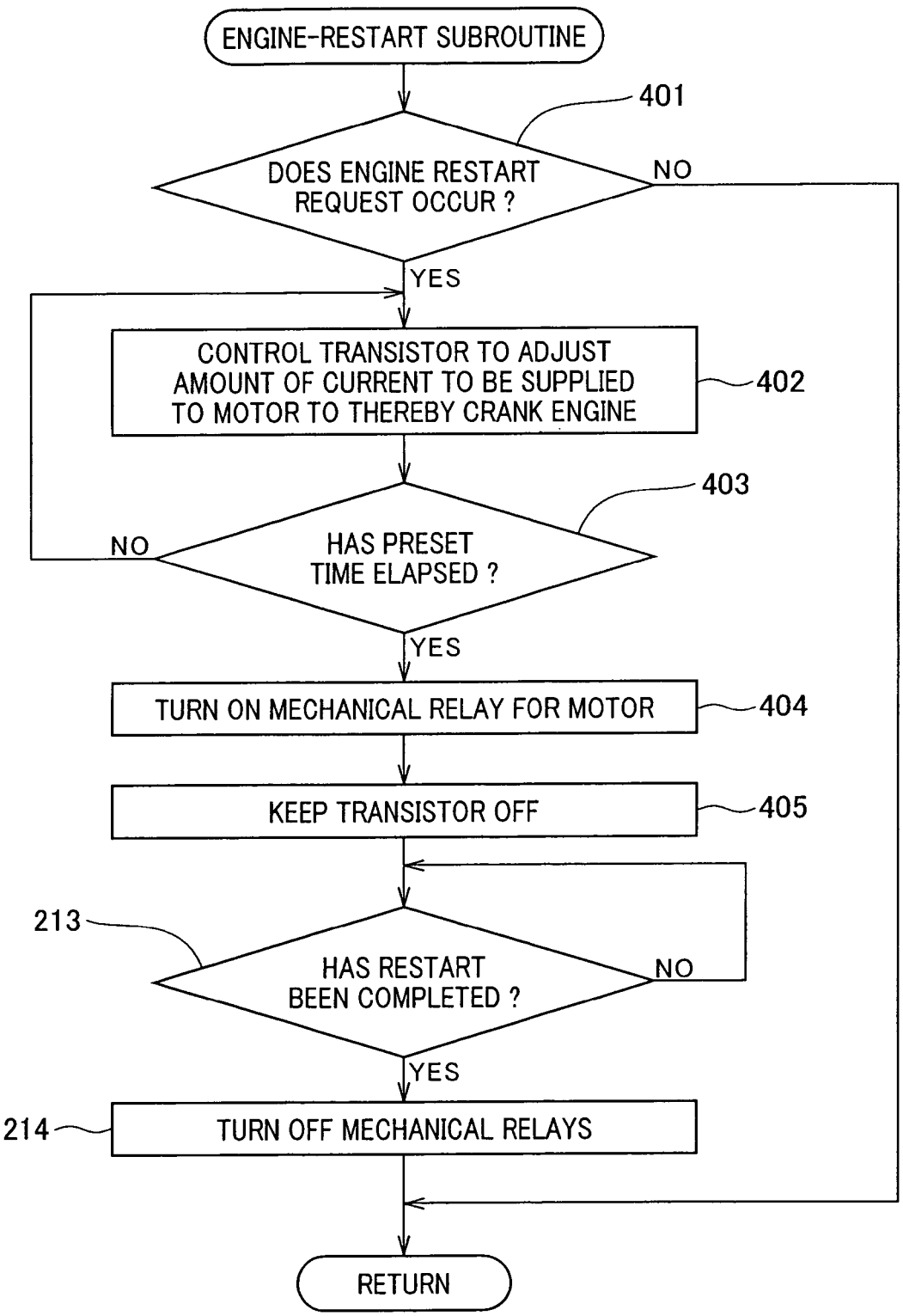
FIG. 7 is a flowchart schematically illustrating an engine-restart subroutine according to the third embodiment of the present invention.

In order to address such a problem, in place of the engine-restart routine R2c illustrated in FIG. 4B, the ECU 20 executes an engine-restart routine illustrated in FIG. 7 in step 102 of FIG. 3A.

When launching the engine-restart routine illustrated in FIG. 7, the ECU 20 determines whether an engine restart request occurs based on the data measured by the sensors 63 and data inputted from another device installed in the vehicle set forth above in step 401.

Upon determining that an engine restart request does not occur (NO in step 401), the ECU 20 exits the engine-restart subroutine and returns to the main routine R1.

Otherwise, upon determining that an engine restart request occurs (YES in step 401), the ECU 20 supplies the pulse signal to the transistor 25 to thereby turn the transistor 25 on and off while modulating the pulse width (on period) of the pulse signal, in other words, changing the duty cycle of the transistor 25 in PWM control mode in step 402. For example, the ECU 20 changes the duty cycle of the transistor 25 to a relatively low level so as to reduce, at low level, the amount of the current to be supplied to the motor 12. This slowly rotates the motor 12, making it possible to prevent the amount of the current to be supplied to the motor 12 from being greatly increased.

Thereafter, the ECU 20 proceeds to step 403 and determines whether a preset time has elapsed since the start of supplying the current to the motor 12 in step 403.

Upon determining that the preset time has not elapsed since the start of supplying the current to the motor 12 (NO in step 403), the ECU 20 repeats the determination in step 403.

Otherwise, upon determining that the preset time has elapsed since the start of supplying the current to the motor 12 (YES in step 403), the ECU 20 determines that the rotational speed of the motor 12 increases at a given level corresponding to a torque load applied to the motor 12 is sufficiently low.

Then, the ECU 20 proceeds to step 404 and energizes the solenoid 24a of the mechanical relay 24 to turn the switch 24b on. This establishes electrical connection between the battery 18 and the motor 12 to rotate the motor 12 (pinion 13). Because the pinion 13 has been meshed with the ring gear 23, the rotation of the pinion 13 cranks the crankshaft 22 of the engine 21 to thereby restart the engine 21 in step 404.

Next, the ECU 20 keeps the transistor 25 off in step 405.

Thereafter, the ECU 20 carries out the operations in steps 213 and 214 described hereinbefore.

As described above, the engine starting system according to the third embodiment is configured to, when restarting the engine 21, supply the pulse signal to the transistor 25 to thereby turn the transistor 25 on and off while modulating the pulse width of the pulse signal in PWM control mode. This reduces, at low level, the amount of the current to be supplied to the motor 12.

Therefore, when the rotational speed of the motor 12 is increased from zero in which the motor 12 is off, in other words, a torque load applied to the motor 12 is high, it is possible to maintain, at low level, the current to be supplied to the motor 12. This prevents the battery voltage from being greatly reduced immediately after the start of the supply of the current to the motor 12. Thus, it is possible to prevent the start of the supply of a current to the motor 12 from adversely affecting another electrical component installed in the vehicle.

In the third embodiment, in step 401, the ECU 20 is configured to adjust the current to be supplied to the motor 12 by turning on and off the transistor 25 in PWM control mode until the preset time has elapsed since the start of the supply of the current to the motor 12, but the present invention is not limited thereto.

Specifically, in step 401, the ECU 20 can be configured to adjust the current to be supplied to the motor 12 by turning on and off the transistor 25 in PWM control mode until the rotational speed of the motor 12 or the amperage of the current to be supplied to the motor 12 increases up to a preset value. The rotational speed of the motor 12 can be measured by a sensor included in the sensors 63 or can be calculated based on the duty cycle of the transistor 25. The amperage can be calculated based on the duty cycle and the battery voltage.

Fourth Embodiment

An engine starting system for the engine 21 according to the fourth embodiment of the present invention will be described hereinafter with reference to FIGS. 8 to 10.

The hardware and software structures of the engine starting system according to the fourth embodiment are substantially identical to those of the engine starting system 1 according to the first embodiment except for the following points. So, like parts between the engine starting systems according to the first and fourth embodiments, to which like reference characters are assigned, are omitted or simplified in description.

Figure 8:
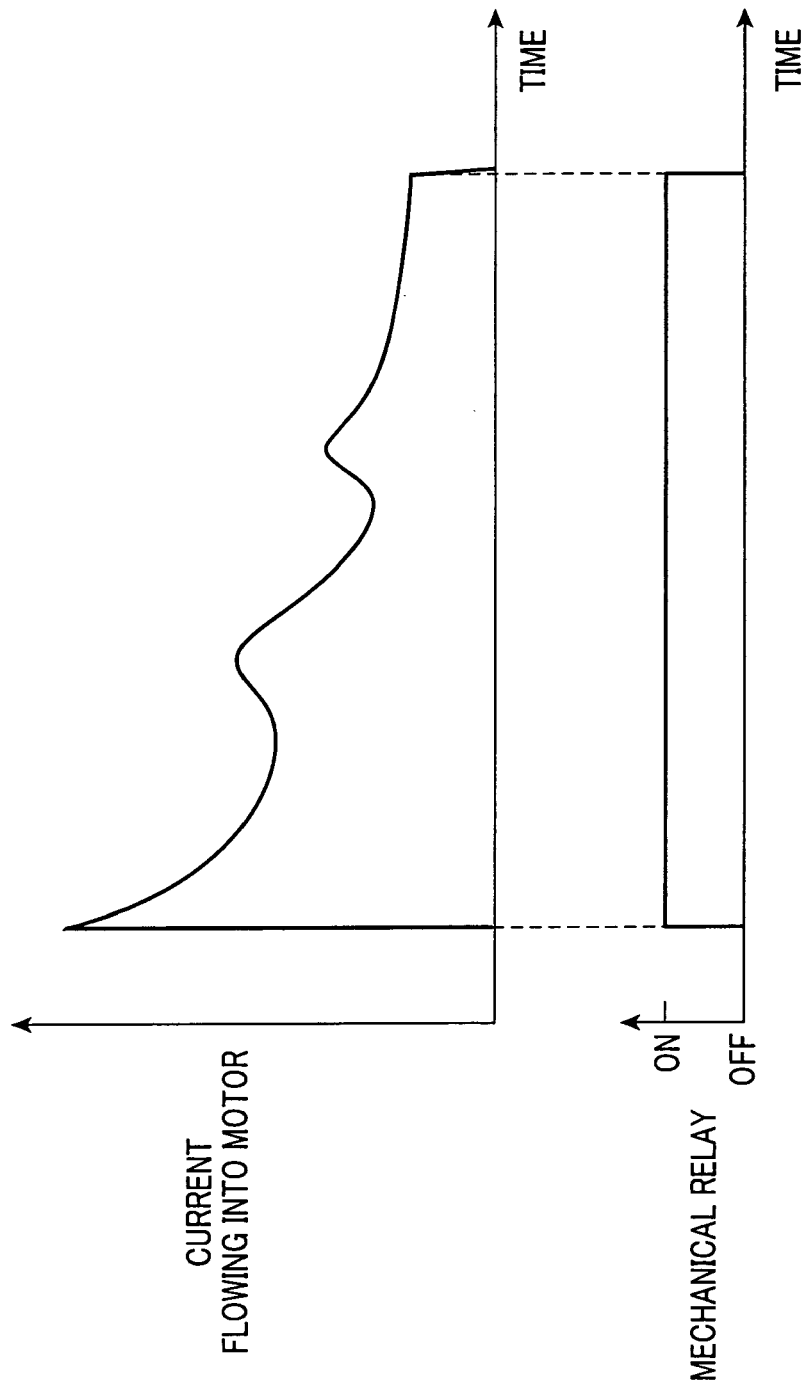
FIG. 8 is a timing chart schematically illustrating a relationship between the variation of a current to be supplied to a motor of a conventional engine starting system over time during a mechanical relay for the motor being on state.

FIG. 8 is a timing chart schematically illustrating a relationship between the variation of a current to be supplied to a motor of a conventional starting system over time during a mechanical relay for the motor being on state.

Referring to FIG. 8, when the mechanical relay is controlled to be on so that the current is supplied through the mechanical relay to the motor in order to crank an engine in the conventional starting system, when the mechanical relay is switched from off state to on state in which the corresponding contacts are closed, the current to be supplied to the motor may abruptly increase. This may cause a large rush current to flow into the motor. If a large rush current caused to flow into the motor, the battery voltage would be greatly reduced. This would adversely affect on another electrical component, such as a car-navigation system, an audio system, a computer system, and the like.

Figure 10:
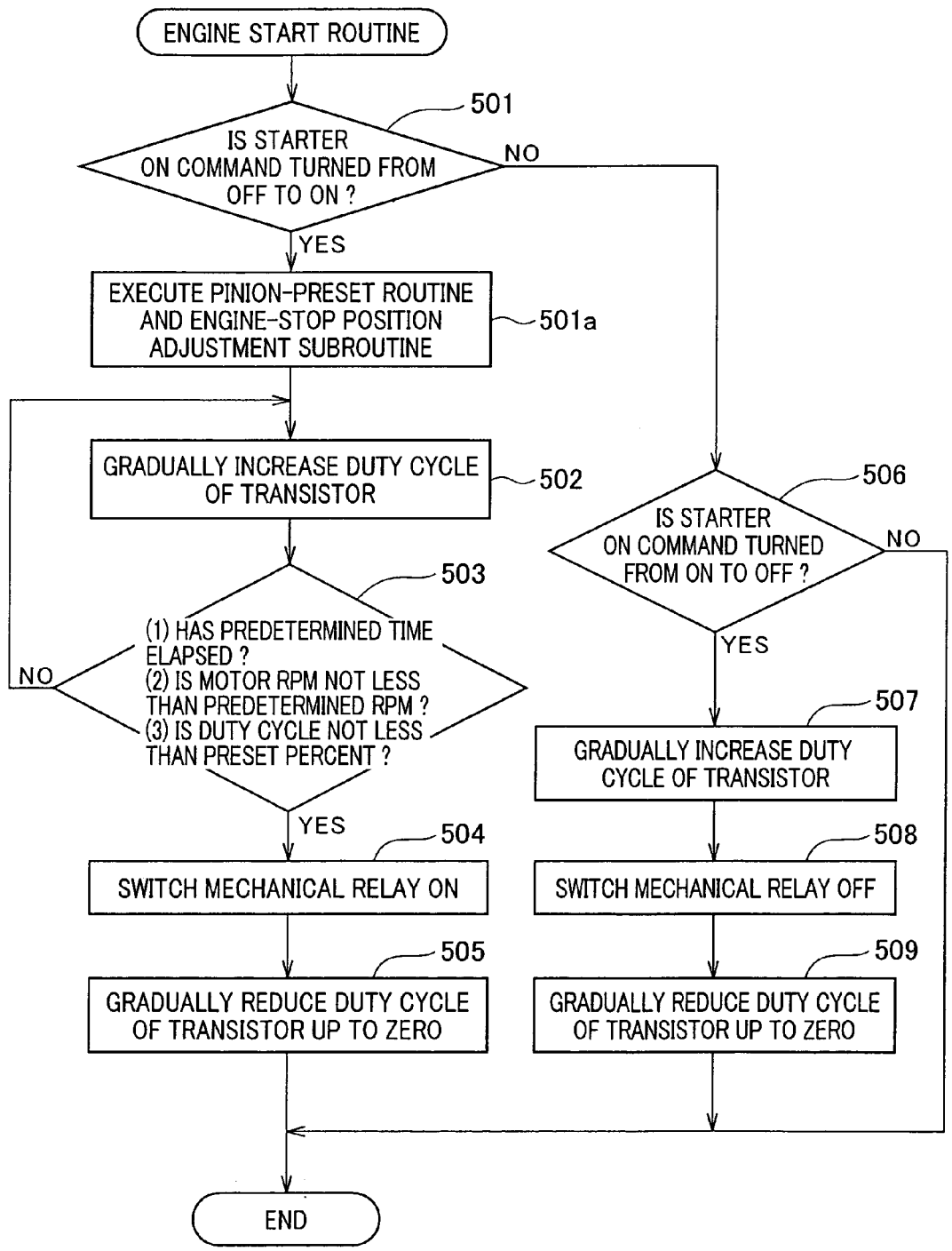
FIG. 10 is a flowchart schematically illustrating an engine starting routine according to the fourth embodiment.

In order to address such a problem, the ECU 20 carries out an engine start routine illustrated in FIG. 10 so as to crank the engine 21 by the starter 11.

Figure 9:
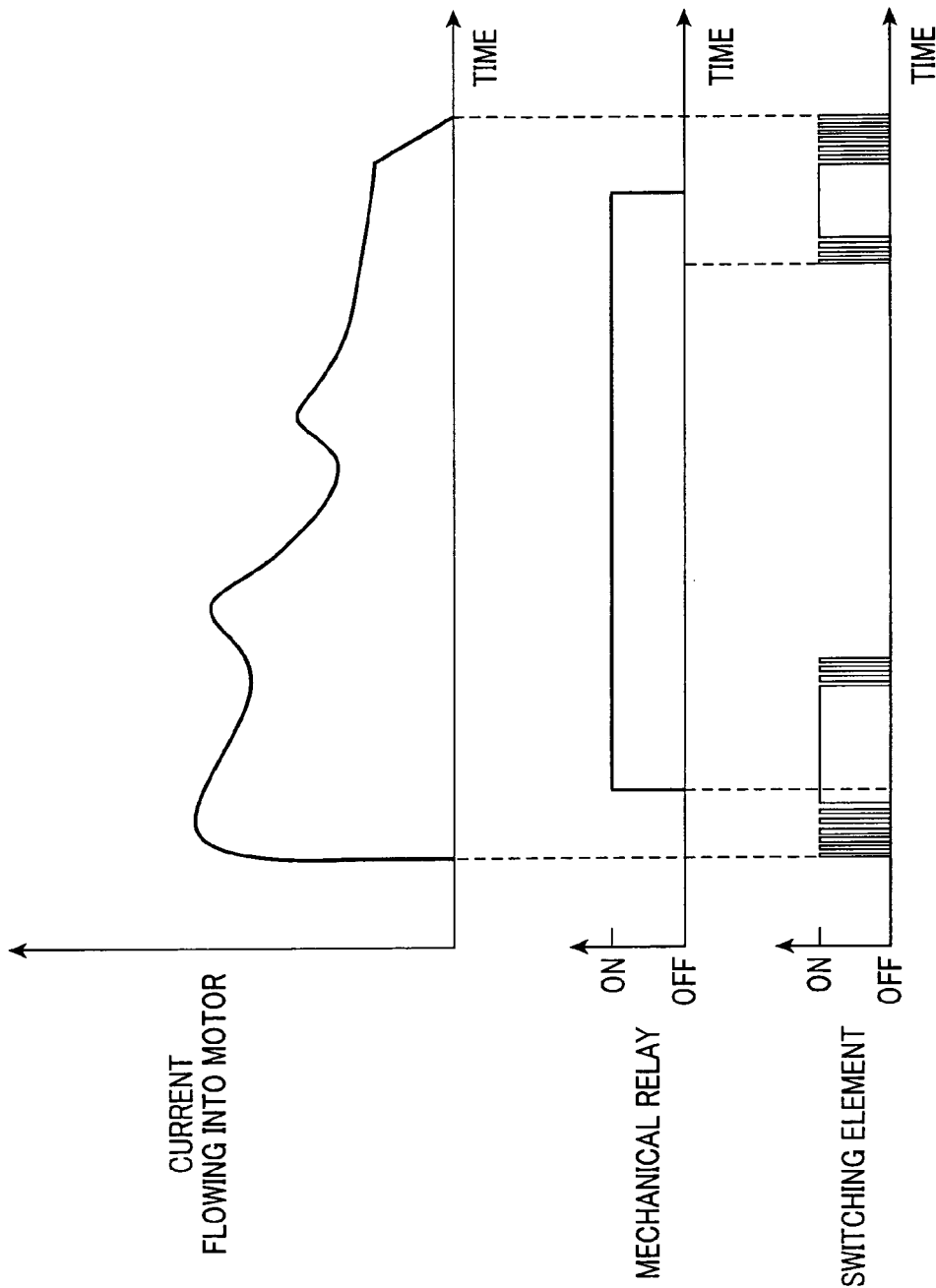
FIG. 9 is a timing chart schematically illustrating a relationship between the variation of a current to be supplied to a motor of an engine starting system according to the fourth embodiment of the present invention over time during a mechanical relay for the motor being on state.

Referring to FIG. 9, when the switch 26 is shifted to the start position by the driver or the engine restart request occurs so that the starter ON command is turned from off to on at time t1, the ECU 20 gradually increases the duty cycle of the transistor 25 in PWM control mode while keeping the mechanical relay 24 off (corresponding contacts are opened). This gradually increases a voltage to be applied to the motor 12.

Thereafter, when at least one of the following first to third conditions is met at time t2, the ECU 20 switches the mechanical relay 24 on (corresponding contacts are closed), and thereafter, gradually reduces the duty cycle of the transistor 25 in PWM control mode up to zero percent:

The first condition is that a predetermined time has elapsed since the start of gradual increase of eth duty cycle;

The second condition is that the rotational speed of the motor 21 is equal to or greater than a predetermined rotational speed; and The third condition is that the duty cycle of the transistor 25 is equal to or greater than a preset percent.

Thereafter, when the duty cycle of the transistor 25 in PWM control mode reaches zero percent, the transistor 25 is switched off.

Thereafter, when the switch 26 is shifted from the start position to another position by the driver or the monitored engine speed reaches the preset speed for determination of restart completion so that the starter ON command is turned from on to off at time t3, the ECU 20 gradually increases the duty cycle of the transistor 25 in PWM control mode while keeping the mechanical relay 24 on (corresponding contacts are opened). This sets the transistor 25 on.

Thereafter, the ECU 20 switches the mechanical relay 24 off (corresponding contacts are opened), and thereafter, gradually reduces the duty cycle of the transistor 25 in PWM control mode up to zero percent. This gradually reduces the voltage to be applied to the motor 12. The ECU 20 finally sets the duty cycle of the transistor 25 in PWM control mode to zero percent, thus interrupting the supply of the current to the motor 12.

Next, specific operations in the engine start routine to be executed by the ECU 20 will be described hereinafter with reference to FIG. 10.

The engine start routine is repeatedly carried by the ECU 20 in a given cycle during the ECU 20 being on.

When the engine start routine is launched, the ECU 20 determines whether it is a time immediately after the starter ON command is turned from off to on in step 501.

Upon determining that it is a time immediately after the starter ON command is turned from off to on (YES in step 501), the ECU 20 proceeds to step 501a.

In step 501a, the ECU 20 carries out the pinion-preset routine R2a and the engine-stop position adjustment subroutine R2b in respective steps 101 and 102 to thereby mesh the pinion 13 with the ring gear 23 and set, to the target crank angle, the crank angle of the crankshaft 21 relative to the reference position (see FIGS. 3B and 4B).

Next, in step 502, the ECU 20 gradually increases the duty cycle of the transistor 25 in PWM control mode while keeping the mechanical relay 24 off (corresponding contacts are opened) in step 502. This gradually increases a voltage to be applied to the motor 12.

Next, the ECU 20 proceeds to step 503, and determines whether mechanical-relay on conditions are established by determining whether at least one of the following first to third conditions is met:

The first condition is that the predetermined time has elapsed since the start of gradual increase of eth duty cycle;

The second condition is that the rotational speed (RPM) of the motor 21 is equal to or greater than the predetermined rotational speed (RPM); and The third condition is that the duty cycle of the transistor 25 is equal to or greater than the preset percent.

When at least one of the first to third conditions is met, the ECU 20 determines that the mechanical-relay on conditions are established (YES in step 503). Note that the ECU 20 can determine that the mechanical-relay on conditions are established when at least two of the first to third conditions are met, or when all of the first to third conditions are met.

When it is determined that the mechanical-relay on conditions are established, the ECU 20 determines that, even if the mechanical relay 24 is switched on, no high rush current flows into the motor 12. Then, the ECU 20 proceeds to step 504, and switches the mechanical relay 24 on (corresponding contacts are closed) in step 504. Next, the ECU 20 gradually reduces the duty cycle of the transistor 25 in PWM control mode up to zero percent in step 505.

Otherwise, upon determining that it is not a time immediately after the starter ON command is turned from off to on (NO in step 501), the ECU 20 proceeds to step 506. In step 506, the ECU 20 determines whether it is a time immediately after the starter ON command is turned from on to off in step 506.

Upon determining that it is not a time immediately after the starter ON command is turned from off to on (NO in step 501), the ECU 20 exits the engine start routine.

Otherwise, upon determining that it is a time immediately after the starter ON command is turned from on to off (YES in step 506), the ECU 20 proceeds to step 507. In step 507, the ECU 20 gradually increases the duty cycle of the transistor 25 in PWM control mode while keeping the mechanical relay 24 on (corresponding contacts are closed). This reduces a current to flow through the mechanical relay 24 to a proper low level.

Thereafter, the ECU 20 switches the mechanical relay 24 off (corresponding contacts are opened) in step 508.

Next, the ECU 20 gradually reduces the duty cycle of the transistor 25 in PWM control mode up to zero percent so as to gradually reduce the voltage to be applied to the motor 12, and finally sets the duty cycle of the transistor 25 in PWM control mode to zero percent, thus interrupting the supply of the current to the motor 12 in step 509. Thereafter, the ECU 20 exits the engine start routine.

As described above, the engine starting system according to the fourth embodiment is configured to gradually increase the duty cycle of the transistor 25 in PWM control mode for starting the drive of the motor 12. This prevents a large rush current from flowing into the motor 12 when starting the supply of a current to the motor 12. This prevents the battery voltage from being greatly reduced, making it possible to prevent the start of the supply of a current to the motor 12 from adversely affecting another electrical component installed in the vehicle.

In addition, the engine starting system according to the fourth embodiment is configured to only temporarily shift the transistor 25 to on state when starting the supply of a current to the motor 12. This does not require consideration of the thermal durability so much, making it possible to use a cheaper and compact switching element (transistor). Thus, the engine starting system according to the fourth embodiment meets the low-cost requirement for vehicles as recent important technical requirements.

Moreover, after the start of the gradual increase in the duty cycle of the transistor 25 in PWM control mode, the engine starting system according to the fourth embodiment determines that, even if the mechanical relay 24 is switched on, no high rush current flows into the motor 12 so long as at least one of the following first to third is met:

The first condition is that the predetermined time has elapsed since the start of gradual increase of eth duty cycle;

The second condition is that the rotational speed (RPM) of the motor 21 is equal to or greater than the predetermined rotational speed (RPM); and The third condition is that the duty cycle of the transistor 25 is equal to or greater than the preset percent.

Thus, it is possible to reliably prevent a large rush current from flowing into the motor 12.

In addition, for switching the transistor 25 off after the mechanical relay 24 has been switched on, the engine starting system according to the fourth embodiment gradually reduces the duty cycle of the transistor 25 in PWM control mode. This prevents a current to be supplied to the motor 12 from being rapidly changed to thereby avoid the output of the motor 12 being suddenly changed. Note that the engine starting system according to the present invention can steeply reduce or step down the duty cycle of the transistor 25 up to zero percent after switching the mechanical relay 24 to thereby switch the transistor 25 off.

For stopping the motor 12, the engine starting system according to the fourth embodiment is adapted to switch the mechanical relay 24 off while switching the transistor 25 on to thereby reduce a current to be supplied to the motor 12 to a proper low level. For this reason, it is possible to restrict arcing between the contacts of the mechanical relay 24, thus improving the durability life of the mechanical relay 24.

The engine starting system according to the fourth embodiment is adapted to gradually reduce the duty cycle of the transistor 25 in PWM control mode to thereby gradually reduce a voltage to be applied to the motor 12. This restricts surge voltages from being generated.

The engine starting system according to the fourth embodiment is adapted to only temporarily shift the transistor 25 to on state for stopping the motor 12. This does not require consideration of the thermal durability so much, making it possible to use a cheaper and compact switching element (transistor). Thus, the engine starting system according to the fourth embodiment meets the low-cost requirement for vehicles as recent important technical requirements.

The engine starting system according to the fourth embodiment is adapted to:

reduce the on duration of the heat-sensitive transistor 25 while increasing the on duration of the heat-resistant mechanical relay 24; and interrupt the supply of a current to the motor 12 using the transistor 25 with the number of on/off of the transistor 25 that depends on its durability life; this number of on/off of the transistor 25 is greater than that of on/off of the mechanical relay 24.

Thus, the engine starting system according to the fourth embodiment utilizes the advantages of both the transistor 25 and the mechanical relay 24, and therefore, makes compact and longer in life both the transistor 25 and mechanical relay 24.

In addition, for switching the transistor 25 off before switching of the mechanical relay 24 off, the engine starting system according to the fourth embodiment gradually increases the duty cycle of the transistor 25 in PWM control mode. This prevents a current to be supplied to the motor 12 from being rapidly changed to thereby avoid the output of the motor 12 being suddenly changed. Note that the engine starting system according to the present invention can steeply increase or step up the duty cycle of the transistor 25 up to a preset percent, such as 100 percent before switching the mechanical relay 24 off to thereby switch the transistor 25 on.

The engine starting system according to each of the aforementioned embodiments and their modifications can be provided with a map designed as, for example, a data table or a program. The map represents a function (relationship) between a variable of the engine speed and a variable of the elapsed time since the occurrence of the engine automatic stop request. The function can have been determined based on data obtained by tests using the engine 21 or its computer model. The function also can have been determined based on design data of the engine 21. The function usually represents that the engine speed is reduced with increase in the elapsed time since the occurrence of the engine automatic stop request.

Specifically, the ECU 20 measures the elapsed time since the occurrence of the engine automatic stop request using, for example, at least one timer or at least one counter installed in the CPU. The ECU 20 references the map using, as a key, the measured value of the elapsed time since the occurrence of the engine automatic stop request. Based on a result of the reference, the ECU 20 retrieves a value of the engine speed corresponding to the measured value of the elapsed time since the occurrence of the engine automatic stop request, thus monitoring the engine speed.

This can measure the engine speed without using the crank angle sensor.

The engine starting system according to each of the aforementioned embodiments and their modifications can be provided with a map designed as, for example, a data table or a program. The map represents a variable of the rotational speed of the pinion 13 as a function of: the elapsed time (energization duration) since the start of the energization of the starter motor 12, and the amount of current to be applied to the starter motor 12 (switching element) 24, such as the duty cycle of the PWM signal to be applied to the switching element 24. The function can have been determined based on data obtained by tests using the engine starting system 1 or its computer model. The function also can have been determined based on design data of the engine starting system 1. The function usually represents that the rotational speed of the starter motor 12 is increased with increase in the elapsed time since the start of the energization of the starter motor 12 and with increase in the current to be applied to the starter motor 12.

Specifically, the ECU 20 measures the elapsed time since the start of the energization of the starter motor 12 using, for example, the at least one timer or the at least one counter installed in the CPU. The ECU 20 references the map using, as a key, the measured value of the elapsed time since the start of the energization of the starter motor 12 and the duty cycle of the starter motor 12. Based on a result of the reference, the ECU 20 retrieves a value of the rotational speed of the pinion 13 corresponding to the measured value of the elapsed time since the start of the energization of the stator motor 12 and the duty cycle thereof, thus monitoring the rotational speed of the pinion 13.

This can measure the rotational speed of the pinion 13 without using a sensor for measuring it.

A one-way clutch can be provided in, for example, helical spline engagement with an outer circumference of one end of the output shaft 12*a*. The one-way clutch is operative to transfer rotational motion supplied from the starter motor 12 to the pinion 13 without transferring rotational motion supplied from the pinion 13 to the starter motor 12.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A system for cranking, according to an occurrence of an engine restart request, a crankshaft of an internal combustion engine that has been automatically controlled for stop thereof in response to an engine automatic stop request to thereby restart the internal combustion engine, the crankshaft having a ring gear attached thereto, the system comprising:

a starter provided with a motor working to, when energized, rotatably drive an output shaft with a pinion and an actuator working to, when energized, shift the pinion toward the ring gear to be engaged with the ring gear;

a power supply electrically connected to the motor and operative to output electrical power;

a first mechanical relay electrically connected between the power supply and the motor and working to turn on and off a supply of a current based on the electrical power to the motor for rotating the pinion;

a switching element electrically connected across the first mechanical relay and working to turn on and off the supply of the current to the motor for rotating the pinion;

a second mechanical relay electrically connected between the power supply and the actuator and working to turn on and off the supply of the current to the actuator for shifting the pinion; and a circuit selecting unit placed between the switching element and the starter and configured to provide selectively one of: a first circuit in which the switching element is electrically connected in parallel to the first mechanical relay; and a second circuit in which the switching element is electrically connected in parallel to the second mechanical relay.

2. The system according to claim 1, further comprising:
a pinion-preset unit configured to energize, at a timing, the actuator to thereby shift the pinion toward the ring gear so that the pinion is meshed with the ring gear, the timing representing any one of: a time immediately before a rotational speed of the internal combustion engine reaches zero; and a time after the rotational speed thereof has reached zero;
an engine-stop position adjustment unit configured to, after the pinion has been meshed with the ring gear, control the current to be supplied to the motor through the switching element to thereby rotate the ring gear of the crankshaft together with the pinion so that a rotational position of the crankshaft is adjusted to a target rotational position; and
an engine restart unit configured to, after the rotational position of the crankshaft has been adjusted, cause the mechanical relay to turn on the supply of the current to the motor to thereby rotate the pinion.

3. The system according to claim 2, wherein the engine restart unit is configured to:
control the current to be supplied to the motor through the switching element until a preset time has elapsed since a start of the supply of the current to the motor through the switching element; and
cause the mechanical relay to turn on the supply of the current to the motor to thereby rotate the pinion after the preset time has elapsed since the start of the supply of the current to the motor through the switching element.

4. The system according to claim 1, further comprising:
a pinion-preset unit configured to:
when the second circuit is selected by the circuit selecting unit, control, at a timing, the supply of the current to the actuator to thereby shift the pinion toward the ring gear so that the pinion is meshed with the ring gear, the timing representing any one of: a time immediately before a rotational speed of the internal combustion engine reaches zero; and a time after the rotational speed thereof has reached zero; and
turn on the second mechanical relay so as to maintain the pinion being meshed with the ring gear.

5. The system according to claim 4, further comprising:
an engine-stop position adjustment unit configured to, after the pinion has been meshed with the ring gear by the pinion preset unit and the first circuit has been selected by the circuit selecting unit, control the current to be supplied to the motor through the switching element to thereby rotate the ring gear of the crankshaft together with the pinion so that a rotational position of the crankshaft is adjusted to a target rotational position.

6. The system according to claim 1, wherein the switching element has a duty cycle representing a ratio of its on duration to a sum of its on duration and off duration, further comprising:

a motor-drive start unit configured to:
when starting a drive of the motor, gradually increase the duty cycle of the switching element while causing the first mechanical relay to turn off the supply of the current to the motor to thereby increase a voltage based on the electrical power of the power supply, the voltage being applied to the motor through the switching element;
after the increase in the voltage applied to the motor, cause the first mechanical relay to turn on the supply of the current to the motor; and
after the first mechanical relay turning on the supply of the current to the motor, cause the switching element to turn off the supply of the current to the motor.

7. The system according to claim 6, wherein the motor-drive start unit is configured to, after a start of the control of the duty cycle of the switching element, cause the first mechanical relay to turn on the supply of the current to the motor when at least one of a first condition, a second condition, and a third condition is met,
the first condition is that a predetermined time has elapsed since the start of the control of the duty cycle,
the second condition is that a rotational speed of the motor is equal to or greater than a predetermined rotational speed,
the third condition is that the duty cycle of the switching element is equal to or greater than a preset percent.

8. The system according to claim 6, wherein the motor-drive start unit is configured to gradually reduce the duty cycle of the switching element when causing the switching element to turn off the supply of the current to the motor.

9. The system according to claim 1, wherein the switching element has a duty cycle representing a ratio of its on duration to a sum of its on duration and off duration, further comprising:
a motor-drive stop unit configured to:
when stopping a drive of the motor, cause the switching element to turn on the supply of the current to the motor while causing the first mechanical relay to turn on the supply of the current to the motor;
after the switching element turning on the supply of the current to the motor, cause the first mechanical relay to turn off the supply of the current to the motor; and
after the first mechanical relay turning off the supply of the current to the motor, gradually reduce the duty cycle of the switching element to thereby reduce a voltage based on the electrical power of the power supply so as to interrupt the supply of the current to the motor, the voltage being applied to the motor through the switching element.

10. The system according to claim 9, wherein the motor-drive stop unit includes an increase unit configured to gradually increase the duty cycle of the switching element when causing the switching element to turn on the supply of the current to the motor.

* * * * *